US012692416B2

(12) United States Patent
Semonick et al.

(10) Patent No.: US 12,692,416 B2
(45) Date of Patent: Jul. 28, 2026

(54) RELEASE COATING COMPOSITIONS FOR PRESSURE SENSITIVE ADHESIVE ARTICLES AND METHODS

(71) Applicant: 3M INNOVATIVE PROPERTIES COMPANY, St. Paul, MN (US)

(72) Inventors: Michael A. Semonick, White Bear Lake, MN (US); Kathryn S. Damien, Minneapolis, MN (US); Ramesh C. Kumar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 663 days.

(21) Appl. No.: 18/018,143

(22) PCT Filed: Jul. 26, 2021

(86) PCT No.: PCT/IB2021/056770

§ 371 (c)(1),
(2) Date: Jan. 26, 2023

(87) PCT Pub. No.: WO2022/043786

PCT Pub. Date: Mar. 3, 2022

(65) Prior Publication Data

US 2023/0272244 A1 Aug. 31, 2023

Related U.S. Application Data

(60) Provisional application No. 63/069,298, filed on Aug. 24, 2020.

(51) Int. Cl.
*C09J 7/20* (2018.01)
*C08K 5/132* (2006.01)
(Continued)

(52) U.S. Cl.
CPC ............... *C09J 7/201* (2018.01); *C08K 5/132* (2013.01); *C08L 35/02* (2013.01); *C09J 7/245* (2018.01);
(Continued)

(58) Field of Classification Search
None
See application file for complete search history.

(56) References Cited

U.S. PATENT DOCUMENTS 3,011,988 A 12/1961 Luedke et al.
5,527,578 A * 6/1996 Mazurek ............. C08F 290/068
428/355 R (Continued)

FOREIGN PATENT DOCUMENTS

CN 104327217 A 2/2015
CN 108541267 A 9/2018

(Continued)

OTHER PUBLICATIONS

"MIRAMER M180", MIRAMER M180 is a mono functional aliphatic acrylate, MIWON Specialty Chemical, Technical Data Sheet, 2017, p. 1.

(Continued)

*Primary Examiner* — Michael G Miller
(74) *Attorney, Agent, or Firm* — Carolyn A. Fischer

(57) ABSTRACT

A method of making a release coated article is described comprising: providing a release coating composition comprising at least 50 wt. % of a mixture of ethylenically unsaturated monomers based on the total ethylenically unsaturated components; wherein the mixture comprises monomer(s) with a linear alkyl group with at least 18 carbon atoms, and monomer(s) with a branched alkyl group with 7 to 31 carbon atoms, and crosslinking component(s) comprising at least two ethylenically unsaturated groups. The
(Continued)

method comprises applying the release coating to a major surface of a substrate and polymerizing the monomer(s) and crosslinking component(s) of the release coating. The monomer(s) with linear alkyl groups and branched alkyl groups are typically present at a weight ratio such that the release coating is a liquid at 25° C. Also described are release coating compositions and articles.

20 Claims, 1 Drawing Sheet

(51) Int. Cl.
*C08L 35/02* (2006.01)
*C09J 7/24* (2018.01)
*C09J 7/38* (2018.01)
*C09J 135/02* (2006.01)

(52) U.S. Cl.
CPC ............... *C09J 7/38* (2018.01); *C09J 135/02* (2013.01); *C09J 2433/005* (2013.01)

(56) References Cited

U.S. PATENT DOCUMENTS

| | | | |
|---|---|---|---|
| 5,700,571 | A | 12/1997 | Logue et al. |
| 6,294,249 | B1 | 9/2001 | Hamer et al. |
| 6,660,354 | B2 | 12/2003 | Suwa et al. |
| 7,816,477 | B2 | 10/2010 | Suwa |
| 9,102,774 | B2 | 8/2015 | Clapper et al. |
| 9,187,678 | B2 | 11/2015 | Boardman et al. |
| 9,475,950 | B2 | 10/2016 | Umebayashi |
| 9,796,885 | B2 | 10/2017 | Bartusiak et al. |
| 9,862,860 | B2 | 1/2018 | Hulme et al. |
| 2006/0141246 | A1 | 6/2006 | DiZio et al. |
| 2007/0112142 | A1 | 5/2007 | Beppu et al. |
| 2013/0045349 | A1 | 2/2013 | Kronzer et al. |
| 2013/0266811 | A1 | 10/2013 | Hinterwaldner et al. |
| 2014/0287642 | A1 | 9/2014 | Kumar et al. |
| 2015/0056757 | A1 | 2/2015 | Liu et al. |
| 2017/0107385 | A1 | 4/2017 | Kumai et al. |
| 2018/0312729 | A1 | 11/2018 | Hirano et al. |
| 2020/0208026 | A1 | 7/2020 | Niwa et al. |

FOREIGN PATENT DOCUMENTS

| | | | |
|---|---|---|---|
| EP | 3587526 | A1 | 1/2020 |
| GB | 843539 | | 8/1960 |
| GB | 1115306 | | 5/1968 |
| JP | 2001123129 | A | 5/2001 |
| JP | 2016-033173 | A | 3/2016 |
| JP | 2019-073691 | A | 5/2019 |
| JP | 2019188639 | A | 10/2019 |
| JP | 2003327946 | A | 11/2019 |
| WO | 2016171221 | A1 | 10/2016 |
| WO | 2018091768 | A1 | 5/2018 |
| WO | 2020245707 | A1 | 12/2020 |

OTHER PUBLICATIONS

International Search Report for PCT International Application No. PCT/IB2021/056770, mailed on Nov. 8, 2021, 5 pages.

"Benefits of Latex Binders for Nonwoven Webs", ASI Adhesives & Sealants Industry, Apr. 2000, [retrieved from the internet on Jan. 24, 2019], URL <https://www.adhesivesmag.com/articles/83839-benefits-of-latex-binders-for-nonwoven-webs> ,6 pages.

"In-line coating with TEGO RC Silicones", Evonik Corporation, Jul. 2017, 16 pages.

"TEGO RC Silicones Practical Guide", Evonik Industries, Jul. 2015, 36 pages.

Döhler, "TEGO RC Silicones Introduction", Evonik Nutrition & Care GmbH, Apr. 2017, 48 pages.

International Search Report for PCT International Application No. PCT/IB2020/055041, mailed on Aug. 6, 2020, 5 pages.

Product Bulletin: "Wingtack Resins", Cray Vally USA LLC, Jan. 2010, 12 pages.

Product Comparison: "Lingnin alkali 4710033 & 370959", Sigma-Aldrich, [retrieved from the internet on Mar. 8, 2019], URL <https://www.sigmaaldrich.com/catalog/substance/ligninalkali12345806805111?lang=en&re >, (Date unknown but believed to be prior to the date of the filing of the present application.), 1 page.

Product Overview: "Quintac Series—Products", Zeon Corporation, Apr. 2019, 2 pages.

Product Overview: "TEGO", Evonik Industries, Jul. 2015, 40 pages.

Technical Information: "TEGO Photoinitiator A 18", Evonik Nutrition & Care GmbH, (Date unknown but believed to be prior to the date of the filing of the present application.), 2 pages.

* cited by examiner

RELEASE COATING COMPOSITIONS FOR PRESSURE SENSITIVE ADHESIVE ARTICLES AND METHODS

SUMMARY

Although various release coating compositions have been described; industry would find advantage in new composition that are amenable to solventless manufacturing methods.

In one embodiment, a method of making a release coated article is described comprising: providing a release coating composition comprising

- at least 50 wt. % of a mixture of ethylenically unsaturated monomers based on the total ethylenically unsaturated components, wherein the mixture comprises
  - monomer(s) with a linear alkyl group with at least 18 carbon atoms, and
  - monomer(s) with a branched alkyl group with 7 to 31 carbon atoms;
- crosslinking component(s) comprising at least two ethylenically unsaturated groups; and a polymerization initiator;
- wherein the release coating composition comprises no greater than 1 wt. % of non-polymerizable organic solvent;
- applying the release coating to a major surface of a substrate;
- polymerizing the monomer(s) and crosslinking component(s) of the release coating after applying the release coating to the substrate.

In favored embodiments, the monomer(s) with linear alkyl groups and branched alkyl groups are present at a weight ratio such that the release coating is a liquid at 25° C.

Also described is a release coating composition comprising:

- at least 50 wt. % of a mixture of ethylenically unsaturated monomers based on the total ethylenically unsaturated components, wherein the mixture comprises
  - monomer(s) with a linear alkyl group with at least 18 carbon atoms; and
  - monomer(s) with a branched alkyl group with 7 to 31 carbon atoms;
- crosslinking component(s) comprising at least two ethylenically unsaturated groups; and
- a polymerization initiator; and
- no greater than 1 wt. % of non-polymerizable organic solvent.

In some embodiments, the monomer(s) and crosslinking component(s) are polymerized (e.g. after applying the release coating composition to a substrate).

Also described is a pressure sensitive adhesive article comprising:

- a substrate; a release coating composition, as described herein, disposed on a major surface of the substrate; and a pressure sensitive adhesive layer in contact with the release coating.

DETAILED DESCRIPTION

Figure 1:
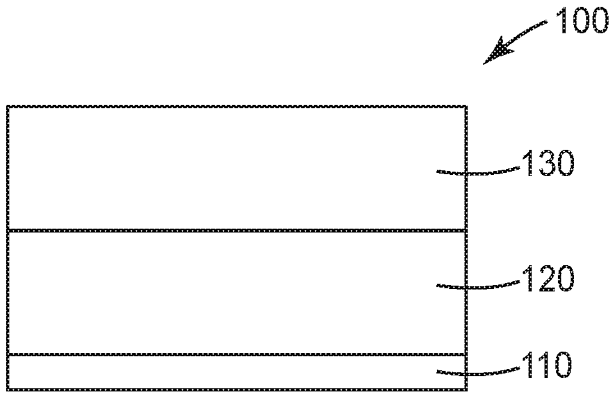
FIG. 1 is a side view of an article including a backing, a release coating on a major surface, and a pressure sensitive adhesive on the opposing major surface of the backing.

The release coating comprises one or more (e.g. free-radically polymerizable) ethylenically unsaturated monomer(s) comprising a branched (e.g. terminal) alkyl group with at least 7 carbon atoms. The carbon atoms of the (meth)acrylate group are not included in the number of carbon atoms of the alkyl group. The branched alkyl group typically comprises no greater than 50 carbon atoms. In some embodiments, the branched alkyl group has no greater than 45, 40, 35, 34, 33, 32, 31 or 30 carbon atoms.

The (e.g. free-radically polymerizable) ethylenically unsaturated monomer(s) comprising a branched (e.g. terminal) alkyl group with at least 7 carbon atoms can be represented by the following Formula I:

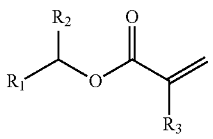

(I)

wherein:

- $R^1$ and $R^2$ are each independently a $C_1$ to $C_{30}$ saturated linear alkyl group (it will be understood that in this formula $R^1$ and $R^2$ are not joined together to form a ring);
- the sum of the number of carbons in $R^1$ and $R^2$ is 7 to 31; and
- $R^3$ is H or $CH_3$.

In some embodiments, the sum of the number of carbons in $R^1$ and $R^2$ is at least 18. When the sum of the number of carbons in $R^1$ and $R^2$ is 18, the monomer may be described as isostearyl acrylate or isooctadecyl acrylate. As used herein the prefix "iso-" refers to an isomer with the same molecular formula, but with one or more different (e.g. branched, non-linear) structures.

In some embodiments, the ethylenically unsaturated monomer(s) comprising a branched (e.g. terminal) alkyl group with at least 7 carbon atoms is an isomer where all the carbons except one form a continuous chain. Such isomer has an isopropyl group at the end of the chain. For example, the term "isostearyl acrylate" has also been used to describe the following compound:

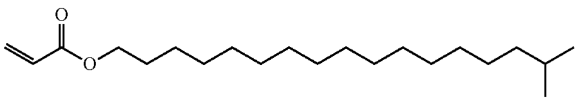 [SMILES: C=CC(=O)OCCCCCCCCCCCCCCCC(C)C]

In other embodiments, the release coating comprises a mixture of at least two isomers. For example, the term "isostearyl acrylate" has been used to describe the following mixture of compounds:

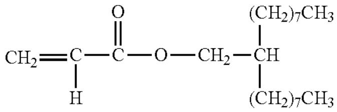

and

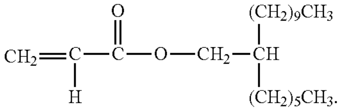

In some embodiments, the (e.g. free-radically polymerizable) ethylenically unsaturated monomer(s) comprising a branched (e.g. terminal) alkyl group includes at least three structural isomers of Formula (I), as described is U.S. Pat. No. 9,102,774; incorporated herein by reference. In some embodiments, the alkyl (meth)acrylate of Formula (I) may comprise 15-85 mole-% of a 2-alkyl (meth)acrylate isomer; 5-50 mole-% of a 3-alkyl (meth)acrylate isomer; 0.5-40 mole-% of a 4-alkyl (meth)acrylate isomer; and 0-50 mole-% of at least one of a 5- through 15-alkyl (meth) acrylate isomer. In some embodiments, the 2-alkyl (meth) acrylate isomer is typically less than 35 mole-% based on the total moles monomer(s) with a branched alkyl group with 7 to 31 carbon atoms.

In some embodiments, the (e.g. free-radically polymerizable) ethylenically unsaturated monomer(s) comprising a branched (e.g. terminal) alkyl group includes one or more structural isomers of Formula (I) wherein the sum of the number of carbons in $R^1$ and $R^2$ is 7 to 17 or in other words has less carbon atoms than isostearyl (meth)acrylate. In some embodiments, the sum of the number of carbons in $R^1$ and $R^2$ is 8, 9, 10, 11, 12, 13, 14, 15, or 16.

In favored embodiments, the ethylenically unsaturated monomer(s) comprising a branched alkyl group with at least 7 carbon atoms is a liquid at 25° C.

The release coating further comprises one or more (e.g. free-radically polymerizable) ethylenically unsaturated monomer(s) comprising a linear alkyl group with at least 18 carbon atoms. The alkyl group may be described as an "n-" alkyl group, meaning all carbons from a continuous, unbranched linear chain.

Representative examples include octadecyl (meth)acrylate, nonadecyl (meth)acrylate, (meth)eicosanyl acrylate, (meth)behenyl acrylate, and the like. Such monomers typically have a molecular weight no greater than 1000, 900, 800, 700, 600 or 500 g/mole. One representative monomer, stearyl acrylate (STA) is depicted as follows:

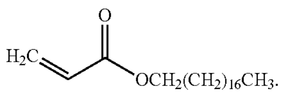

Ethylenically unsaturated monomers comprising a linear alkyl group having at least 18 (e.g. contiguous) carbon atoms are typically solid at room temperature and have a melting point of at least 20, 25, 30, 35, 40, 45, or 50° C. Without intending to be bound by theory, such melting temperature is surmised to be associated with the melting of the (e.g. C18) crystalline side chains. In some embodiments, the (e.g. side chain) melting temperature of the polymerized release coating is typically no greater than 100, 95, 90, 85, 80, 75, 70, 65 or 60° C. The melting temperature can be measured by Differential Scanning Calorimetry (DSC) according to ASTM D3418-15 at a heating/cooling rate of 10° C./minute under nitrogen atmosphere.

The ethylenically unsaturated group $CH_2$=CH— of both the branched and linear monomer is typically bonded to the alkyl group through an ester linking group —(CO)O—. However, other divalent or higher valency organic linking groups may be present instead of an ester linkage, provided that the organic linking group does not detract from the liquid properties of the branched alkyl moiety or detract from the crystalline properties of the linear alkyl moieties having at least 18 carbon atoms. The alkyl group of both the branched and linear monomer are typically contiguous. However, the alkyl group may optionally be interrupted with heteroatoms or other divalent organic linking groups provided that the presence of such heteroatoms does not detract from the liquid properties of the branched alkyl moiety or detract from the crystalline properties of the linear alkyl moieties having at least 18 carbon atoms. In typical embodiments, acrylate free-radically polymerizable ethylenically unsaturated monomer(s) are favored over methacrylate, especially for solventless manufacturing.

The release coating composition comprises ethylenically unsaturated monomers comprising a linear alkyl group having at least 18 carbon atoms and ethylenically unsaturated monomers comprising a branched alkyl group having at least 7 carbon atoms in a total amount of at least 50 wt. % based on the total (e.g. free-radically polymerizable) ethylenically unsaturated monomer(s) of the release coating composition. The total amount of ethylenically unsaturated monomers comprising a linear alkyl group having at least 18 carbon atoms and ethylenically unsaturated monomers comprising a branched alkyl group having at least 7 carbon atoms is typically equal to or greater than the sum of the other polymerizable components of the mixture. In some favored embodiments, the total amount of ethylenically unsaturated monomers comprising a linear alkyl group having at least 18 carbon atoms and ethylenically unsaturated monomers comprising a branched alkyl group having at least 7 carbon atoms is at least 55, 60, 65, 70, 75, 80, 85, 90, or 95 wt. % of the total ethylenically unsaturated components of the release coating.

The weight ratio of ethylenically unsaturated monomers comprising a linear alkyl group having at least 18 carbon atoms to ethylenically unsaturated monomers comprising a branched alkyl group having at least 7 carbon atoms can range from 5:95 to 95:5 based on the total weight of such ethylenically unsaturated monomers. In some embodiments, the weight ratio of ethylenically unsaturated monomers comprising a linear alkyl group having at least 18 carbon atoms to ethylenically unsaturated monomers comprising a branched alkyl group having at least 7 carbon atoms can range from 10:90 to 90:10 or 20:80 to 80:20. In some embodiments, it is preferred to maximize the concentration of ethylenically unsaturated monomers comprising a linear alkyl group having at least 18 carbon atoms which can be amenable to improved crystallization and alignment of the alkyl chains to thereby providing better release (e.g. lower release values). However, when the release composition comprises a weight ratio of 80 n-stearyl acrylate to 20 isostearyl acrylate; the release composition can be a solid, rather than a liquid at 25° C.

In favored embodiments, the concentration of one or more branched ethylenically unsaturated monomers comprising an alkyl group having at least 7 carbon atoms as well as the kinds and amount of crosslinking monomer, and optional other components (e.g. monomers) are selected such that the polymerized release coating is a liquid at 25° C.

Thus, in typical favored embodiments, wherein the release composition is a liquid at 25° C., the monomer(s) with linear (C18+) alkyl groups and branched (C7+) alkyl groups are present at a weight ratio less than 80:20, 75:25, 70:30, 65:35, 60:40, 55:45. Further, in some embodiments, the monomer(s) with linear (C18+) alkyl groups and branched (C7+) alkyl groups are present at a weight ratio less than 50:50, 45:55, 40:60, 35:65, 30:70.

In other embodiments, such as when the release composition contains substantially more linear monomer(s) than branched ethylenically unsaturated monomers comprising an alkyl group having at least 18 carbon atoms, the release composition may have melting temperature of at least 30, 35, 40, 45, or 50° C. Without intending to be bound by theory, such melting temperature is surmised to be associated with the melting of the (e.g. C18) crystalline side chains. In some embodiments, the (e.g. side chain) melting temperature of the polymerized release coating is typically no greater than 100, 95, 90, 85, 80, 75, 70, 65 or 60° C. The melting temperature can be measured by Differential Scanning Calorimetry (DSC) according to the test method described in the example.

In some embodiments, the release coating optionally further comprises other (e.g. free-radically polymerizable) ethylenically unsaturated monomers, oligomers, or polymers. This includes, for example, ethylenically unsaturated monomers comprising other alkyl groups, polar monomer, aromatic monomer, and silicone components.

In some embodiments, the release coating optionally further comprises ethylenically unsaturated monomers comprising a linear alkyl group comprising 5-17 carbon atoms. Such optional alkyl (meth)acrylate monomer(s) are typically monofunctional, having a single ethylenically unsaturated (e.g. (meth)acrylate) group.

In some embodiments, the optional ethylenically unsaturated monomers comprise at least 10, 11, or 12 carbon atoms. Representative examples include for example lauryl (meth)acrylate, tridecyl (meth)acrylate, tetradecyl (meth) acrylate, pentadecyl (meth)acrylate, hexadecyl (meth)acrylate, heptadecyl (meth)acrylate.

In some embodiments, the optional ethylenically unsaturated monomers comprise less than 10 carbon atoms. Representative examples include methyl (meth)acrylate, ethyl (meth)acrylate, butyl (meth)acrylate, hexyl(meth)acrylate, heptyl(meth)acrylate, octyl(meth)acrylate, and nonyl(meth) acrylate. The release coating can comprise various mixtures of such optional alkyl (meth)acrylate monomers.

The concentration of such optional alkyl (meth)acrylate monomers can vary depending on the chain length of the alkyl (meth)acrylate monomers. In favored embodiments, the kind and amount of alkyl (meth)acrylate monomers is typically selected such that the presence thereof does not detract from the liquid property of the unpolymerized release coating. The concentration of optional alkyl (meth) acrylate monomers is typically less than the sum of ethylenically unsaturated monomer(s) comprising a linear alkyl group with at least 18 carbon atoms and ethylenically unsaturated monomer(s) comprising a branched alkyl group with at least 7 carbon atoms. Thus, the concentration of optional alkyl (meth)acrylate monomers is typically less than 50, 45, 40, 35, 30, 25, 20, or 15 wt. % based on the total amount of ethylenically unsaturated components. In some embodiments, the concentration of optional alkyl (meth) acrylate monomers is no greater than 10, 9, 8, 7, 6, 5, 4, 3, 2 or 1 wt. %.

In some embodiments, the ethylenically unsaturated monomer(s) comprising a linear alkyl group with at least 18 carbon atoms or branched alkyl group with at least 7 carbon atoms may be purchased from a supplier and due to the purity being less than 100/a, it may contain a small concentration of optional alkyl (meth)acrylate monomers.

In some embodiments, the mixture of monomers of the release coating may optionally further comprise a polar monomer such as acrylonitrile, n-vinylpyrrolidone, acrylic acid, methacrylic acid, a $C_1$-$C_4$ alkyl ester of (meth)acrylic acid, and/or hydroxyl-functional $C_1$-$C_4$ alkyl ester of (meth) acrylic acid. In some embodiments, the mixture of monomers of the release coating may optionally further comprise aromatic monomers such as styrene. When present such monomers are typically present in an amount no greater than 10, 9, 8, 7, 6, 5, 4, 3, 2, or 1 wt. % of the total ethylenically unsaturated components of the release coating.

The release coating composition further comprises at least one crosslinking component comprising at least two (e.g. free-radically polymerizable) ethylenically unsaturated groups. The crosslinking component may be a monomer, oligomer, or polymer. In some embodiments, the crosslinking component lacks polydiorganosiloxane moieties. In other embodiments, the crosslinking component comprises polydiorganosiloxane moieties.

In some embodiments, the crosslinking component is a multifunctional ethylenically unsaturated monomer. In some embodiments, the crosslinking monomer comprises at least 3, 4, 5, or 6 (e.g. free-radically polymerizable) ethylenically unsaturated groups. Such crosslinking monomers typically have a molecular weight no greater than 1000 g/mole.

In some embodiments, the crosslinking monomer is not a silicone monomer, oligomer, or polymer. In this embodiment, the release coating can be silicone free. Useful (i.e. silicone-free) multi-(meth)acrylate monomers and oligomers include for example:

(a) di(meth)acryl containing monomers such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing monomers such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate, pentaerythritol triacrylate (commercially available from Sartomer under the trade designation "SR444"), and ethoxylated pentaerythritol triacrylate (from Sartomer under the trade designation "SR494")

(c) higher functionality (meth)acryl monomers such as pentaerythritol tetraacrylate, dipentaerythritol pentaacrylate (commercially available from Sartomer under the trade designation "SR399"), ethoxylated pentaerythritol tetraacrylate, dipentaerythritol hexaacrylate, and tris(2-hydroxy ethyl) isocyanurate triacrylate (from Sartomer under the trade designation "SR368".

In some embodiments, the crosslinking component is an oligomeric (meth)acryl monomer such as, for example, urethane acrylates, polyester acrylates, and epoxy acrylates. Such (meth)acrylate components are available from vendors such as, for example, Sartomer Company of Exton, Pennsylvania; Cytec Industries of Woodland Park, NY; and Aldrich Chemical Company of Milwaukee, Wisconsin. Such oligomer (meth)acryl component may have molecular weights ranging up to 5000 to 10,000 g/mole. In some embodiments, the release composition comprises little or no oligomeric (meth)acryl components. In such embodiment, the concentration of oligomeric (meth)acryl components is no greater than 10, 9, 8, 7, 6, 5, 4, 3, 2, or 1 wt. % of the total ethylenically unsaturated components of the release coating.

In some embodiments, the glass transition temperature (Tg) of a homopolymer of the crosslinking component is at least 50, 55, 60, 65, 70 or 75° C. In some embodiments, the Tg of the crosslinking component is no greater than 200° C., 175° C., 150° C., or 100° C.

In some embodiments, the crosslinking monomer comprises one or more ethoxylated groups $—(CH_2O)n-$ between terminal ethylenically unsaturated (e.g. (meth)acrylate groups).

In some embodiments, the crosslinking component is a silicone oligomer or polymer. The silicone crosslinking components are typically fluids, having a viscosity no greater than 10,000; 5,000; 2,500; or 1,000 mPas at 25° C. For example, silicone crosslinking component commercially available as TEGO™ RC 902 is reported to have a viscosity at 25° C. of 420 mPas. Further, silicone crosslinking component commercially available as TEGO™ RC 711 has a viscosity at 25° C. of 600 mPas. Both of such silicone acrylates have a volatile content of less than 1% and thus the viscosity is a function of the molecular weight and not dilution with an organic solvent.

The silicone crosslinking components comprises a polysiloxane backbone. Such silicone components may be characterized as "functional" in view of comprising (e.g. pendant and or terminal) ethylenically unsaturated (e.g. (meth)acrylate) groups.

In some embodiments, the silicone crosslinking component can be represented by the following formula:

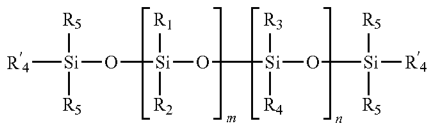

wherein $R_1$, $R_2$, and $R_3$ are independently selected from an alkyl group or an aryl group, $R_5$ is an alkyl group; one or more $R_4$ or $R'_4$ groups comprise an ethylenically unsaturated (e.g. (meth)acrylate) group; and n and m are the number of repeat units. In some embodiments, one or more of the alkyl or aryl groups may contain a halogen substituent, e.g., fluorine. For example, in some embodiments, one or more of the alkyl groups may be $—CH_2CH_2C_4F_9$.

In some embodiments, $R_1$ and $R_2$ are (e.g. methyl) alkyl groups and n is 1, i.e., the material is a poly(dialkylsiloxane). In some embodiments, the alkyl group is a methyl group, i.e., poly(dimethylsiloxane) ("PDMS"). In some embodiments, $R_1$ is an alkyl group, $R_2$ is an aryl group, and n is zero, i.e., the material is a poly(alkylarylsiloxane). In some embodiments, $R_1$ is methyl group and $R_2$ is a phenyl group, i.e., the material is poly(methylphenylsiloxane). In some embodiments, $R_1$ and $R_2$ are alkyl groups and $R_3$ and $R_4$ are aryl groups, i.e., the material is a poly(dialkyldiarylsiloxane). In some embodiments, $R_1$ and $R_2$ are methyl groups, and $R_3$ and $R_4$ are phenyl groups, i.e., the material is poly(dimethyldiphenylsiloxane).

In some embodiments, $R_5$ and $R'_4$ is a methyl group, i.e., the polydiorganosiloxane crosslinking component is terminated by trimethylsiloxy groups. In this embodiment, n is at least one and $R_4$ comprise an ethylenically unsaturated (e.g. (meth)acrylate) group. Thus, such silicone crosslinking component comprises pendant ethylenically unsaturated (e.g. (meth)acrylate) groups.

In other embodiments, $R_4$ is a methyl group and $R'_4$ comprises ethylenically unsaturated (e.g. (meth)acrylate) group. Thus, such silicone crosslinking component comprises terminal ethylenically unsaturated (e.g. (meth)acrylate) groups.

The $R_4$ or $R'_4$ group may have the formula $CH_2═CH(CO)O-L-$ wherein L is a covalent bond, alkylene, arylene, alkarylene, or arylalkylene.

One of ordinary skill in the art appreciates that the number of dimethylsiloxane repeat groups ("in" of the above representative structure) and pendent acrylate functional groups ("n" of the above representative structure) can also be expressed in terms of molecular weight, as can be determined with Gel Permeation Chromatography (GPC) using polystyrene standards. The number average molecular weight of the polyorganosiloxane crosslinking component is typically at least 200 g/mole, 300 g/mole, or 400 g/mole. In some embodiments, the number average molecular weight is at least 500 g/mole, 700 g/mole, 700 g/mole, 800 g/mole, 900 g/mole, or 1000 g/mole. In some embodiments, the number molecular weight of the polyorganosiloxane crosslinking component is at least 2000 g/mole, 3000 g/mole, 4000 g/mole, or 5,000 g/mole. In some embodiments, the number molecular weight of the polyorganosiloxane crosslinking component is at least 10,000 g/mole or 15,000 g/mole.

In some embodiments, the weight average molecular weight of the polyorganosiloxane crosslinking component is at least 1,000; 2,000; 3,000; 4,000; or 5,000 g/mole. In some embodiments, the weight average molecular weight of the polyorganosiloxane crosslinking component is no greater than 50,000 g/mole; 45,000 g/mole; 40,000 g/mole; 35,000 g/mole; 30,000 g/mole; 25,000 g/mole; or 20,000 g/mol.

In some embodiments, the polydispersity of the polyorganosiloxane crosslinking component typically ranges from 2 to 3.

The silicone crosslinking component is not a mercapto-functional silicone macromonomer, such as described in US2014/0287642. One of ordinary skill in the art appreciates that although the mercapto group are free-radically polymerizable, such groups are not ethylenically unsaturated and terminate the polymerization through chain transfer.

In some embodiments, the release coating composition may optionally further comprise a silicone macromer has the general formula $X—(Y)_nSiR_{(3-m)}Z_m$, wherein X is a (meth)acrylate group, Y is a divalent linking group where n is zero or 1, m is an integer of from 1 to 3;

R is hydrogen, lower alkyl (e.g., methyl ethyl, or propyl), aryl (e.g., phenyl or substituted phenyl), or alkoxy; and Z is a monovalent siloxane polymeric moiety having a number average molecular weight above about 1,000 g/mole. The siloxane polymeric moiety lacks functional groups that copolymerize with the (e.g. free-radically polymerizable) ethylenically unsaturated groups of the monomer(s) and crosslinking component(s) of the release coating.

A preferred silicone macromer (as utilized in the examples) has the formula:

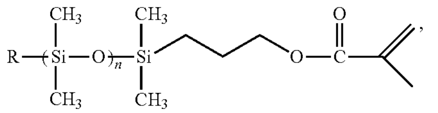

$n$ = 100 to 300 and R is H or an alkyl group.

Combinations of silicone macromers may also be used.

Such silicone macromers are monofunctional and thus are not crosslinking components. When present, such silicone macromers are typically present in an amount no greater than 10, 9, 8, 7, 6, 5, 4, 3, 2, or 1 wt. % of the total (e.g. free radically polymerizable) ethylenically unsaturated components of the release coating.

In some embodiments, the (e.g. release) composition optionally further comprises one or more additives. Additives include for example one or more antioxidants, light (e.g. UV) stabilizers, leveling agents, thermal stabilizers, rheology modifier, colorants, UV or fluorescent dyes, antimicrobial compositions, plasticizers, and the like. The one or more additives typically can be present in the composition in amounts ranging from about 0.01 wt % to 10 wt % based on the total composition and may depend on the type of additive and the final properties of the release coating. In some embodiments, the total amount of additives is no greater than 9, 8, 7, 6, 5, 4, 3, 2, or 1 wt. % of the total solids (i.e. excluding any solvent that may be present) composition.

In some embodiments, the release coating may optionally further comprise a filler. Fillers can be used to reduce the cost or alter the color and/or opacity of the release coating. Useful fillers include, for example, clay, talc, dye and pigment particles and colorants (for example, $TiO_2$ or carbon black), glass beads, metal oxide particles, silica particles, and surface-treated silica particles (such as Aerosil R-972 available from Degussa Corporation, Parsippany, N.J.). Typically, filler will be added at a concentration of about 1 or 2 wt. % ranging up to 25 wt. % by weight, based upon the total solids of release coating.

A typical solution polymerization method is carried out by preheating the monomer(s) comprising a linear alkyl group with at least 18 carbon atoms above the melt point of the monomer(s), adding the monomer(s) comprising a branched alkyl group with at least 18 carbon atoms, crosslinking component(s), and optional monomers, a suitable solvent, and an optional chain transfer agent to a reaction vessel, adding a free radical initiator, purging with nitrogen, and maintaining the reaction vessel at an elevated temperature (e.g. about 40 to 100° C.) until the reaction is complete, typically in about 1 to 20 hours, depending upon the batch size and temperature.

Examples of suitable solvents include alkanes (e.g. heptane) and ketones such as acetone and methyl ethyl ketone. Those solvents can be used alone or as mixtures thereof. The amount of organic solvent is typically about 30 to 98 percent by weight (wt. %) based on the total weight of the solution.

Unlike conventional solution polymerization, one embodied method of making a release coated article comprises applying the mixture of unpolymerized monomer(s) and crosslinking component(s), optional solvent and preferably solventless, and free radical initiator to a major surface of a substrate. The method further comprises polymerizing the monomer(s) and crosslinking component(s) of the release coating after applying the release coating to the substrate (rather than being polymerized in a reaction vessel).

Thus, the monomer(s) and crosslinking component(s) of the release composition can be polymerized on the substrate by various techniques including, solvent polymerization and solventless bulk polymerization including processes using radiation polymerization. The release composition typically comprises a polymerization initiator, such as a thermal initiator or a photoinitiator of a type and in an amount effective to polymerize the comonomers and crosslinking components(s).

The release compositions described herein may be applied to a substrate (e.g. tape backing) by means of conventional coating techniques such as wire-wound rod, (e.g. direct, kiss, reverse) gravure, 3 roll and 5 roll coating, air-knife, spray coating, notch-bar coating, knife coating, slot die coating (including application to a tensioned web), immersion dip coating, curtain coating and trailing blade coating. In some embodiments, the release coating is applied with a gravure coater at volume factors ranging from about 0.5 to 5, 6, 7, 8, 9, 10, 15, 20, 25, or 30 billion cubic microns per square inch. The coating equipment may be heated such that the release composition remains above its melting point. This may include any combination of heated vessels for delivery such as heated tubing, heated pumping elements, heated coating dies/fluid applicators, and heated rolls (e.g. for conveying the substrate). The temperature may be controlled to the same temperature or different temperatures throughout the coating process. The temperature may be controlled by any acceptable means, i.e. resistive heating tape, recirculating fluid (e.g. water, oil), infrared, etc. In preferred embodiments, the release composition remains above its melting point as it is dispensed onto the substrate. The temperature at which the coating equipment is maintained is typically room temperature (approximately 25° C.), 30° C., 40° C., 50° C., 60° C., or 70° C.

Depending on the coating method, the coating may be a continuous or discontinuous coating. The thickness or mass per area of the release coating can vary. In some embodiments, the coating has a thickness of at least 0.0025 microns (2.5 nanometers) ranging up to 25 microns. In some embodiments, the discontinuous coating has a mass per area of at least 0.0025 grams per square meter (gsm) ranging up to 25 gsm. In some embodiments, the thickness/mass per area is at least 0.05, 0.1, 0.2, 0.3, 0.4, or 0.5 microns/gsm. In some embodiments, the thickness/mass per area is no greater than 10, 9, 8, 7, 6, or 5 microns/gsm.

In a favored embodiment, polymerization is conducted in the absence of (unpolymerizable) organic solvents and in absence of oxygen (typically achieved by nitrogen inerting). Even though solvent may not affect formation of a crosslinked polymer network, the formation of side chain crystal can be impacted, thus resulting in a coating with different release force properties.

In yet another embodiment, the monomer(s) and crosslinking component(s) of the release coating can be partially polymerized to produce a syrup composition comprising a solute (meth)acrylic polymer dissolved in the (e.g. unpolymerized) monomer(s). Partial polymerization provides a higher viscosity coatable solution of the (meth)acrylic solute polymer in one or more free-radically polymerizable monomers. In some embodiments, polymerization to achieve a coatable viscosity may be conducted such that the conversion of monomers to polymer is up to about 30%. The partially polymerized composition is then coated on a suitable substrate and further polymerized. In this embodiment, the monomer(s) comprising a terminal alkyl group with at least 18 carbon atoms can be partially polymerized prior to adding the crosslinking component(s).

Useful polymerization (e.g. free radical) initiators include those that, on exposure to heat or light, generate free-radicals that initiate (co)polymerization of the mixture of monomer(s) and crosslinking component(s). The initiators are typically employed at concentrations ranging from about 0.0001 to about 3.0 parts by weight, preferably from about 0.001 to about 1.0 parts by weight, and more preferably from about 0.005 to about 0.5 parts by weight of the total polymerizable components.

Suitable thermal initiators include various azo compound such as those commercially available under the trade designation VAZO from Chemours Co. (Wilmington, Del., USA) including VAZO 67, which is 2,2'-azobis(2-methylbutane nitrile), VAZO 64, which is 2,2'-azobis(isobutyronitrile), VAZO 52, which is (2,2'-azobis(2,4-dimethylpentanenitrile), and VAZO 88, which is 1,1'-azobis (cyclohexanecarbonitrile); various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, Pa., USA) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and mixtures thereof.

Useful photoinitiators include benzoin ethers such as benzoin methyl ether and benzoin isopropyl ether; substituted acetophenones; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl) oxime.

Exemplary substituted acetophenones include 2,2-diethoxyacetophenone or 2,2-dimethoxy-2-phenylacetophenone (commercially available under the trade designation IRGACURE 651 from BASF Corp. (Florham Park, N.J., USA) or under the trade designation ESACURE KB-1 from Sartomer (Exton, Pa., USA)), dimethylhydroxyacetophenone, and 2-hydroxy-2-methyl-phenyl-1-propane (TEGOM Photoinitiator A18). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation IRGACURE 184), bis(2,4,6-trimethylbenzoyl)phenyl phosphine oxide (commercially available under the trade designation IRGACURE 819), 1-[4-(2-hydroxyethoxy)phenyl]-2-hydroxy-2-methyl-1-propane-1-one (commercially available under the trade designation IRGACURE 2959), 2-benzyl-2-dimethylamino-1-(4-morpholinophenyl)butanone (commercially available under the trade designation IRGACURE 369), 2-methyl-1-[4-(methylthio) phenyl]-2-morpholinopropan-1-one (commercially available under the trade designation IRGACURE 907), and 2-hydroxy-2-methyl-1-phenyl propan-1-one (commercially available under the trade designation DAROCUR 1173 from Ciba Specialty Chemicals Corp. (Tarrytown, N.Y., USA)).

After applying the polymerizable mixture to the substrate, polymerization of the ethylenically unsaturated monomer(s) and crosslinking component(s) can be accomplished by exposing the (dried solvent-containing, solventless, or syrup) release composition to radiant energy, typically in the presence of a photoinitiator.

In some embodiments, the release composition is exposed to UV radiation. UV light sources can be of various types including relatively low light intensity sources such as blacklights, which provide generally 10 $mW/cm^2$ or less (as measured in accordance with procedures approved by the United States National Institute of Standards and Technology as, for example, with a UVIMAP UM 365 L-S radiometer manufactured by Electronic Instrumentation & Technology, Inc., Sterling, Va.) over a wavelength range of 280 to 400 nanometers; and relatively high light intensity sources such as medium pressure mercury lamps which provide intensities generally greater than 10 $mW/cm^2$, typically 15 to 450 $mW/cm^2$. The monomer and crosslinking component(s) can also be polymerized with high intensity light sources as available from Fusion UV Systems Inc. UV light to polymerize the monomer and crosslinking component(s) can be provided by light emitting diodes, blacklights, medium pressure mercury lamps, etc. or a combination thereof.

The release coating can be applied to a wide variety of substrates (e.g. tape backings). In some embodiments, the substrate is an organic polymeric film, metal coated film, metallic foil, paper, foam, or (e.g. woven or non-woven) fibrous web. In some embodiments, the substrate is a woven (including knitted) or (e.g. spunbond or melt blown) non-woven fibrous web, such as typically used for backings of medical tapes and dressings. In some embodiments, the substrate is paper that may include a coating, such as those used for release liners, masking tapes, and self-stick note pads.

Suitable polymeric films include, for example, polyester films such as polyethylene terephthalate (PET), polylactic acid (PLA) and polyethylene naphthalate (PEN); polyolefin films such as polyethylene and polypropylene (e.g. biaxial oriented polypropylene, BOPP); polyamide films such as nylon; polyimide films such as KAPTON (available from DuPont deNemours Corp., Wilmington, Del.); cellulose acetate; polyvinylchloride; polytetrafluoroethylene and the like.

In some embodiments, the thickness of the substrate is at least 0.5, 1 or 2 mils and typically no greater than 5, 10 or 15 mils.

One or both major surfaces of the substrate (e.g. backing) may further comprise a primer layer or be surface treated (e.g. corona treated), as known in the art to promote adhesion of the release coating, adhesive or both.

The resulting PSA articles may be a tape, label, or wound dressings. The adhesive articles may be in the form of a sheet, multilayer sheet, or stack of sheets (e.g. note pad, easel pad, label pad, tape stack), or in the form of a roll, such as a roll of tape.

One illustrative PSA article 100 is shown in FIG. 1. This embodied (e.g. tape) article comprise release coating 110 disposed on a major surface of substrate (e.g. backing) 120 and a pressure sensitive adhesive 130 disposed on the opposing major surface of 120.

Figure 2:
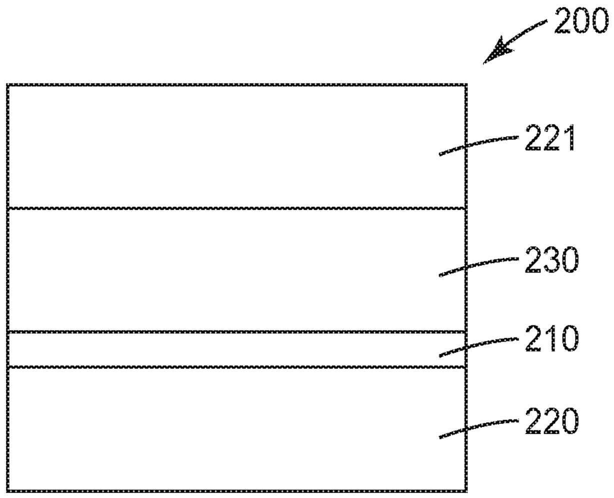
FIG. 2 is a side view of another article comprising a release coated backing and a separate pressure sensitive adhesive coated substrate.

FIG. 2 depicts another PSA article 200. This embodied article comprising a release coating 210 disposed on a major surface of substrate (e.g. backing) 220. A pressure sensitive adhesive 230 is releasably bonded to the release coating 210. The pressure sensitive adhesive is disposed on a major surface of a second substrate 221.

Figure 3:
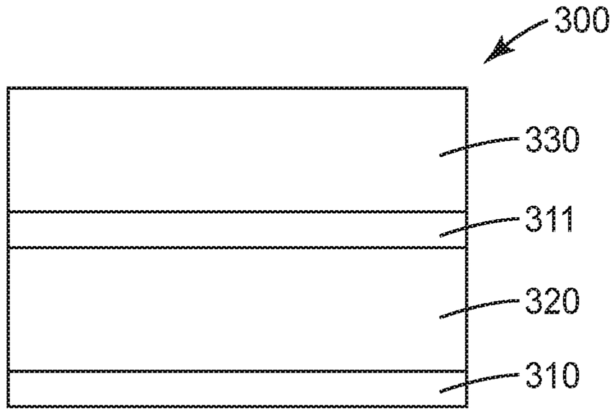
FIG. 3 is a side view of another article comprising a backing with release coating on both major surfaces and a pressure sensitive adhesive between the release-coated surfaces.

FIG. 3 depicts another PSA article 300. This embodied (e.g. tape) article comprises release coatings 310 and 311 disposed on both major surfaces of substrate (e.g. backing) 320 and a pressure sensitive adhesive 330 releasably bonded to release coating 311. One or both of release coatings 310 and 311 are a release coating as described herein.

The release coating described herein is suitable for use with a wide variety of pressure sensitive adhesive compositions. Suitable (e.g. pressure sensitive) adhesives include natural or synthetic rubber-based pressure sensitive adhesives, acrylic pressure sensitive adhesives, vinyl alkyl ether pressure sensitive adhesives, silicone pressure sensitive adhesives, polyester pressure sensitive adhesives, polyamide pressure sensitive adhesives, poly-alpha-olefins, polyurethane pressure sensitive adhesives, and styrenic block copolymer based pressure sensitive adhesives. Pressure sensitive adhesives generally have a storage modulus (E') as can be measured by Dynamic Mechanical Analysis at room temperature (25° C.) of less than $3\times10^6$ dynes/cm at a frequency of 1 Hz.

The pressure sensitive adhesives may be organic solvent-based, a water-based emulsion, hot melt (e.g. such as described in U.S. Pat. No. 6,294,249), heat activatable, as well as an actinic radiation (e.g. e-beam, ultraviolet) curable pressure sensitive adhesive. The heat activatable adhesives can be prepared from the same classes as previously described for the pressure sensitive adhesive. However, the components and concentrations thereof are selected such that the adhesive is heat activatable, rather than pressure sensitive, or a combination thereof.

In some embodiments, the organic solvent is removed from the pressure sensitive adhesive prior to contacting the adhesive with the release coating described herein. In some embodiments, the hot melt adhesive is contacted with the release coating at a temperature below the melt temperature of the release coating composition. Exposure to organic solvent or heat can disrupt the crystallization of the side chains and thereby alter the release properties. For example, after exposure the coating can function as a primer or adhesion promoter, rather than a release coating.

The pressure sensitive adhesive may further include one or more suitable additives according to necessity. The additives are exemplified by crosslinking agents (e.g. multifunctional (meth)acrylate crosslinkers (e.g. TMPTA), epoxy crosslinking agents, isocyanate crosslinking agents, melamine crosslinking agents, aziridine crosslinking agents, etc.), tackifiers (e.g., phenol modified terpenes and rosin esters such as glycerol esters of rosin and pentaerythritol esters of rosin, as well as C5 and C9 hydrocarbon tackifiers), thickeners, plasticizers, fillers, antioxidants, ultraviolet absorbers, antistatic agents, surfactants, leveling agents, colorants, flame retardants, and silane coupling agents.

The release composition can exhibit good release properties with a variety of different adhesive compositions of commercially available tapes. In some embodiments, the release properties described herein were determined with Testing Tape 1, having a 25 micron thick layer of hot melt adhesive comprising a mixture of 100 parts of SIS block copolymer (having a styrene content of 14.3%, a coupling efficiency of 88% and a melt index of 9 g/10 min (condition G)), 85 parts of tackifying resin (C9 modified C5 having a softening point of 87° C.) and 2 parts of antioxidant disposed on a 50 micron thick of corona treated BOPP film.

The average (aged for 7 days at 23° C. and 50% Humidity or at 50° C.) release force of the release coating can generally range from 1 ounce/inch (11.2 g/cm) to 25 ounces/inch (280 g/cm) at a peel rate of 90 inches (228.6 cm)/min.

In some embodiments, the average release force is at least 2, 3, 4, 5, 6, or 7 (22.3, 33.5, 44.6, 55.8, 78.1 g/cm) ounces/inch at a peel rate of 90 inches (228.6 cm)/min. A higher average initial release force at slower peel rates can be preferred in some embodiments to prevent a roll of tape from self-unwinding or to provide greater holding power when over taping occurs such as for packaging tape and medical tape.

In some embodiments, the average release force is no greater than 15 (168 g/cm) or 10 (112 g/cm) and in some embodiments no greater than 9 (100.8 g/cm), 8 (89.6 g/cm), 7 (78.1 g/cm), 6 (67 g/cm), 5 (55.8 g/cm), 4 (44.6 g/cm), or 3 (33.5 g/cm) ounces/inch at a peel rate of 90 inches (228.6 cm)/min. In some embodiments, the difference in average release force between 7 days at 23° C. and 50% humidity or at 50° C. is no greater than 25, 20, 15, or 10% of the average CTH value.

Readhesion typically ranges from 10 to 60 ounces/inch. In some embodiments, the readhesion is no greater than 50, 40, or 30 ounces/inch. In some embodiments, the difference in readhesion between 7 days at 23° C. and 50% humidity or at 50° C. is no greater than 25, 20, 15, or 10% of the average CTH value.

In some embodiments, the release composition may be utilized as a low adhesion backsize (LAB) of a tape.

It is appreciated that the release and readhesion values can vary depending of the adhesive composition. It is also appreciated that the preferred release and readhesion values can vary depending on the tape.

EXAMPLES

Unless otherwise noted or readily apparent from the context, all parts, percentages, ratios, etc. in the Examples and the rest of the specification are by weight.

Table of Materials/Equipment Utilized for the Examples

| Abbreviation | Description | Source |
|---|---|---|
| STA | Stearyl Acrylate (solid at 25° C.) | Miwon North America, Exton Pennsylvania, USA |
| ISA | Isostearyl Acrylate (liquid at 25° C.) | Kowa 6-29, Nishiki 3-chome, Naka-ku, Nagoya, Aichi, Japan |
| HDDA | 1,6-Hexanediol Diacrylate | MilliporeSigma, St. Louis, Missouri, USA |
| 2EHA | 2-Ethylhexyl Acrylate | BASF Corporation, Florham Park, New Jersey, USA |

-continued

| Table of Materials/Equipment Utilized for the Examples | | |
|---|---|---|
| Abbreviation | Description | Source |
| C8 Isomer Blend | Isomer blend of C8 alkyl acrylates prepared according to U.S. Pat. No. 9,102,774 | |
| C12 Isomer Blend | Isomer blend of C12 alkyl acrylates prepared according to U.S. Pat. No. 9,102,774 | |
| 2OA | 2 Octyl Acrylate | 3M Company, St. Paul Minnesota, USA |
| Tego 711 | Silicone Acrylate | Evonik Industries AG, Essen, Germany |
| TMPTA | Trimethylolpropane Triacrylate | Tokyo Kasei Kogyo Company LTD, Tokyo, Japan |
| Q3620 | SIS block copolymer having a styrene content of 14.3%, a coupling efficiency of 88% and a melt index of 9 g/10 min (condition G) available as the trade designation QUINTAC 3620 | Zeon, Tokyo, Japan |
| W86 | C9 modified C5 tackifying resin having a Ring and Ball Softening point of 87° C. available as the trade designation "WINGTACK ™ 86" | Cray Valley, Exton, PA |
| Omnirad 1173 | Photoinitiator (2-hydroxy-2-methyl-1-phenylpropanone) | IGM Resins B.V., Waalwijk, The Netherlands |
| 2 mil PET film | 2262 2 mil Polyester Film | Mitsubishi Polyester Film, Inc., Greer, South Carolina, USA |
| 810 Tape | Scotch ™ Magic Tape 810 | 3M Company, St. Paul Minnesota, USA |
| 845 Tape | Scotch ™ Book Tape, with acrylic adhesive | 3M Company, St. Paul Minnesota, USA |
| 232 Tape | 3M ™ High Performance Masking Tape 232, with rubber adhesive | 3M Company, St. Paul Minnesota, USA |
| Coating Rod | #3 Wire-Wound Coating Rod | RD Specialties, Inc., Webster, New York, USA |
| UV Chamber | DRS(6)-110QN Benchtop Conveyor | Heraeus Noblelight Fusion, Inc., Lino Lakes, Minnesota, USA |
| Imass Peel Tester | Model TL-2300 | Instrumentor Inc., Strongsville, OH, USA |

Testing Tape 1 was prepared by hotmelt continuous coating at about 25 micron thickness of a synthetic rubber based adhesive mixture comprising 100 parts of Q3620, 85 parts of W86, and 2 parts of antioxidant onto a 50 micron thick corona treated BOPP film. The opposite side of the BOPP film was then coated with a solvent based comparative release coating and dried.

Method of Preparing Coated and UV Curable LAB Examples

STA was heated at 65° C. until liquid before mixing with other monomers and photoinitiator. Each of the mixtures was a liquid at 25° C. unless specified otherwise.

Approximately 2-3 milliliters were placed on a 15.2 centimeter wide piece of the polyester film and a thin (6.8 microns) coating applied by wiping a thin film via a 3RDS coating bar to give an approximately 75 centimeter long piece of coated polyester film. The coated film was then immediately processed with two passes at 12.2 meter/minute through the UV chamber, that was inerted with nitrogen to a level of less than 35 ppm oxygen, and fitted with a H-Bulb with a dosage of 400 millijoules/centimeter$^2$ UVB.

Testing of Coated UV Cured LAB Samples

Various adhesive tape strips (approximately 2.5×20 centimeters) were laminated against the UV cured coated LAB samples on the polyester film with 2 swipes of a 2 kg roller at approximately 230 cm/minute and stored at either constant temperature and humidity (CTH) at 23° C. and 50% Humidity or at 50° C., both for 7 days.

Release force was measured by peeling the test specimens on an IMASS machine with a 5 kg load cell at 180 degree peel angle with a 228.6 cm/minute peel rate over 5 seconds.

Readhesion force was measured after specimens from release force peel testing were re-laminated against a glass surface with 2 swipes of a 2 kg roller at approximately 230 cm/minute. Specimens were immediately peeled from the glass at 180 degree peel angle with a 228.6 cm/minute peel rate over 5 seconds to determine Readhesion values. All values are reported as the average of 3 repetitions, and are reported in grams/centimeter.

Ex. 1. STA/ISA at a weight ratio of 40/60 4.8 g, 1 g Tego 711, 4 g TMPTA, and 0.2 g Omnirad 1173.

Ex. 2. STA/ISA at a weight ratio of 40/60 6.8 g, 1 g Tego 711, 2 g TMPTA, and 0.2 g Omnirad 1173.

Ex. 3. STA/ISA at a weight ratio of 50/50 4.8 g, 1 g Tego 711, 4 g TMPTA, and 0.2 g Omnirad 1173.

Ex. 4. STA/ISA at a weight ratio of 40/60 8.8 g, 1 g TMPTA, and 0.2 g Omnirad 1173.

Ex. 5. STA/ISA at a weight ratio of 40/60 3 g, 0.5 g TMPTA, and 0.2 g Omnirad 1173.

Ex. 6. STA/ISA at a weight ratio of 30/70 7.8 g, 2 g TMPTA, and 0.2 g Omnirad 1173.

Ex. 7. STA/ISA at a weight ratio of 60/40 9 g, 0.8 g TMPTA, and 0.2 g Omnirad 1173.

Ex. 8. STA/ISA at a weight ratio of 40/60 9 g, 0.8 g TMPTA, and 0.2 g Omnirad 1173.

Ex. 9. STA/ISA at a weight ratio of 40/60 8 g, 1 g Tego 711, 0.8 g TMPTA, and 0.2 g Omnirad 1173.

Ex. 10. STA/ISA at a weight ratio of 40/60 7.8 g, 2 g TMPTA, and 0.2 g Omnirad 1173.

Ex. 11. STA/C8 Isomer Blend at a weight ratio of 30/70 8.8 g, 1 g TMPTA, and 0.2 g Omnirad 1173.

Ex. 12. STA/ISA at a weight ratio of 35/65 8 g, 1 g Tego 711, 0.8 g TMPTA, and 0.2 g Omnirad 1173.

Ex. 13. STA/ISA at a weight ratio of 50/50 6.8 g, 1 g Tego 711, 2 g TMPTA, and 0.2 g Omnirad 1173.

Ex. 14. STA/ISA at a weight ratio of 50/50 7.8 g 2 g TMPTA, and 0.2 g Omnirad 1173.

Ex. 15. STA/ISA at a weight ratio of 80/20 7.8 g, 2 g TMPTA, and 0.2 g Omnirad 1173. This composition became a waxy semi-solid at 25° C. while being coated, prior to curing.

Ex. 16. STA/C12 Isomer Blend at a weight ratio of 30/70 8.8 g, 1 g TMPTA, and 0.2 g Omnirad 1173

Testing Tape 1

| | Release oz/inch (g/cm) | | Readhesion oz/inch (g/cm) | |
|---|---|---|---|---|
| Ex. | Aged 7 days CTH | Aged 7 days 50° C. | Aged 7 days CTH | Aged 7 days 50° C. |
| Ex. 1 | 2.47 (27.6) | 2.77 (30.9) | 46.90 (523) | 48.44 (541) |
| Ex. 3 | 2.32 (25.9) | 1.04 (11.6) | 52.56 (587) | NM |
| Ex. 6 | 8.40 (93.7) | 7.50 (83.7) | 52.81 (589) | 59.06 (659) |
| Ex. 12 | 2.91 (32.4) | 3.94 (43.9) | 40.20 (449) | 43.00 (480) |
| Ex. 13 | 2.19 (24.4) | 1.38 (15.4) | 49.90 (557) | NA |
| Ex. 14 | 7.69 (85.8) | 6.29 (70.2) | 53.75 (599) | 59.87 (668) |
| Ex. 15 | (35.7) | (89.3) | (513) | (469) |

NM = not measured

810 Tape

| | Release g/cm | | Readhesion g/cm | |
|---|---|---|---|---|
| Ex. | Aged 7 days CTH | Aged 7 days 50° C. | Aged 7 days CTH | Aged 7 days 50° C. |
| Ex. 1 | 73.6 | 72.3 | 207 | 202 |
| Ex. 2 | 91.7 | 74.2 | 241 | 196 |
| Ex. 3 | 71.3 | 64.8 | 205 | 201 |
| Ex. 4 | 74.3 | 81.8 | 134 | 176 |
| Ex. 5 | 51.6 | 55.1 | 123 | 165 |
| Ex. 6 | 114 | 121 | 170 | 190 |
| Ex. 16 | 146 | 153 | 276 | 262 |

845 Tape

| | Release g/cm | | Readhesion g/cm | |
|---|---|---|---|---|
| Ex. | Aged 7 days CTH | Aged 7 days 50° C. | Aged 7 days CTH | Aged 7 days 50° C. |
| Ex. 4 | 103 | 87.2 | 301 | 332 |
| Ex. 5 | 67.5 | 76.1 | 313 | 326 |
| Ex. 6 | 98.3 | 135 | 185 | 264 |
| Ex. 7 | 62.9 | 60.6 | 291 | 333 |
| Ex. 8 | 149 | 113 | 375 | 383 |
| Ex. 9 | 101 | 93.9 | 200 | 331 |
| Ex. 10 | 151 | 144 | 291 | 352 |
| Ex. 11 | 206 | 199 | 340 | 374 |

232 Tape

| | Release g/cm | | Readhesion g/cm | |
|---|---|---|---|---|
| Ex. | Aged 7 days CTH | Aged 7 days 50° C. | Aged 7 days CTH | Aged 7 days 50° C. |
| Ex. 1 | 217 | 230 | 457 | 490 |
| Ex. 2 | 186 | 176 | 453 | NA |

Example 4 was also tested using the epoxy based adhesive described at pg. 11, Table 4, of EP 3587526 as follows:

| Raw Materials | wt.-% |
|---|---|
| Epikote Resin 828 | 54.5 |
| PKHP-200 | 26 |
| Paraloid EXL 2650J | 13.5 |
| Amicure CG1200 | 3.3 |
| Omicure U52M | 1.5 |
| Microsphere ®F48D | 1.2 |
| Sum | 100.0 |

Test specimens were prepared as above and tested after 3 days at CTH with a 180 degree peel at a peel rate of 30.5 centimeter/minute as follows:

| Sample | Release Aged 3 days CTH |
|---|---|
| Example 4 | 9.7 g/cm (0.095N/cm) |

The release value is greater than an easy release liner (obtained under the trade designation "3M NON-SILICONE/NON-FLUORINE POLYESTER LINER 5977" from 3M, St. Paul, Minn.), yet lower than the other release formulations reported in Table 5 of EP 3587526 as follows:

| Formulation | 180° Peel Force (ambient −3 days) N/cm |
|---|---|
| RCP-01S | 0.967 |
| RCP-02S | 0.428 |
| RCP-03S | 0.303 |
| RCP-04S | 0.427 |
| RCP-04S1 | 0.517 |
| 5977 liner | 0.072 |

What is claimed is:

1. A method of making a pressure sensitive adhesive article comprising:

providing a release coating composition comprising at least 50 wt. % of a mixture of ethylenically unsaturated monomers based on the total ethylenically unsaturated components, wherein the mixture comprises monomer(s) with a linear alkyl group with at least 18 carbon atoms, and monomer(s) with a branched alkyl group with 7 to 31 carbon atoms;

crosslinking component(s) comprising at least two ethylenically unsaturated groups and wherein the crosslinking component(s) lacks polydiorganosiloxane moieties; and a polymerization initiator;

wherein the release coating composition comprises no greater than 1 wt. % of non-polymerizable organic solvent;

applying the release coating to a major surface of a substrate;

polymerizing the monomer(s) and crosslinking component(s) of the release coating after applying the release coating to the substrate; and contacting a pressure sensitive adhesive to the release coating.

2. The method of claim 1 wherein the polymerization initiator is a free-radical initiator.

3. The method of claim 2 wherein the free-radical initiator is a photoinitiator.

4. The method of claim 1 wherein the monomer(s) with linear alkyl group and branched alkyl group are present at a weight ratio such that the release coating is a liquid at 25° C.

5. The method of claim 1 wherein the monomer(s) with a linear alkyl group and the monomer(s) with a branched alkyl group are present at a weight ratio less than 80:20, 75:25, 70:30, 65:35, 60:40, or 55:45.

6. The method of claim 1 wherein the monomer(s) with a linear alkyl group and the monomer(s) with a branched alkyl group are present at a weight ratio less than 50:50, 45:55, 40:60, 35:65, or 30:70.

7. The method of claim 1 wherein the monomer(s) with a branched alkyl groups comprises

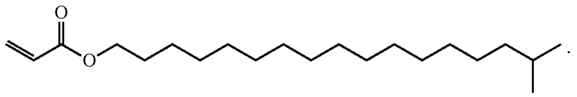 [SMILES: C=CC(=O)OCCCCCCCCCCCCCCCC(C)C]

8. The method of claim 1 wherein the momomer(s) with a branched alkyl group have the formula (I)

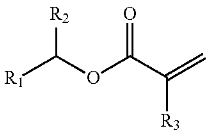

wherein:

$R^1$ and $R^2$ are each independently a $C_1$ to $C_{30}$ saturated linear alkyl group;

the sum of the number of carbons in $R^1$ and $R^2$ is 7 to 31; and $R^3$ is H or $CH_3$.

9. The method of claim 8 wherein the sum of the number of carbons in $R^1$ and $R^2$ is 7 to 17.

10. The method of claim 1 wherein the momomer(s) with a branched alkyl group comprise at least three structural isomers of alkyl (meth)acrylate of the formula:

(I)

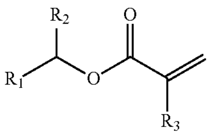

wherein:

$R^1$ and $R^2$ are each independently a $C_1$ to $C_{30}$ saturated linear alkyl group;

the sum of the number of carbons in $R^1$ and $R^2$ is 7 to 31; and $R^3$ is H or $CH_3$.

11. The method of claim 1 wherein the crosslinking component(s) comprises at least 3, 4, 5, or 6 ethylenically unsaturated groups.

12. The method of claim 1 wherein the crosslinking component(s) is not an aliphatic urethane (meth)acrylate.

13. The method of claim 1 wherein the ethylenically unsaturated groups are free-radically polymerizable groups.

14. The method of claim 13 wherein the free-radically polymerizable groups are (meth)acrylate groups.

15. The method of claim 1 wherein the substrate is selected from an organic polymeric film, metal coated film, metallic foil, paper, or fibrous web.

16. A pressure sensitive adhesive article comprising:

a substrate;

a release coating composition disposed on a major surface of the substrate, wherein the release coating comprises polymerized units of at least 50 wt. % of a mixture of ethylenically unsaturated monomers based on the total ethylenically unsaturated components, wherein the mixture comprises monomer(s) with a linear alkyl group with at least 18 carbon atoms; and monomer(s) with a branched alkyl group with 7 to 31 carbon atoms;

crosslinking component(s) comprising at least two ethylenically unsaturated groups and wherein the crosslinking component(s) lacks polydiorganosiloxane moieties; and a pressure sensitive adhesive layer in contact with the release coating.

17. The pressure sensitive adhesive article of claim 16 wherein the pressure sensitive adhesive comprises at least one polymer selected from an acrylic copolymer, natural rubber, synthetic rubber, or a silicone polymer.

18. The pressure sensitive adhesive article of claim 16 wherein the monomer(s) with a linear alkyl group and the monomer(s) with a branched alkyl group are present at a weight ratio less than 80:20, 75:25, 70:30, 65:35, 60:40, or 55:45.

19. The pressure sensitive adhesive article of claim 16 wherein the monomer(s) with a linear alkyl group and the monomer(s) with a branched alkyl group are present at a weight ratio less than 50:50, 45:55, 40:60, 35:65, or 30:70.

20. The method pressure sensitive adhesive article of claim 16 wherein the momomer(s) with a branched alkyl group comprise at least three structural isomers of alkyl (meth)acrylate of the formula:

(I)

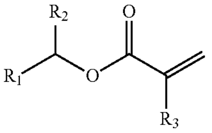

wherein:

$R^1$ and $R^2$ are each independently a $C_1$ to $C_{30}$ saturated linear alkyl group;

the sum of the number of carbons in $R^1$ and $R^2$ is 7 to 31; and $R^3$ is H or $CH_3$.

* * * * *